United States Patent [19]

Kay

[11] 4,292,678

[45] Sep. 29, 1981

[54] METHOD OF AND APPARATUS FOR ECHO LOCATION OF OBJECTS

[76] Inventor: Leslie Kay, 82 Scarborough Rd., Christchurch 8, New Zealand

[21] Appl. No.: 65,880

[22] Filed: Aug. 13, 1979

[30] Foreign Application Priority Data

Aug. 14, 1978 [NZ] New Zealand .................. 188126

[51] Int. Cl.³ .................... G01S 15/34; G01S 15/88
[52] U.S. Cl. ................... 367/102; 343/5 BL; 367/910
[58] Field of Search ........... 367/102, 910; 343/5 BL, 343/14

[56] References Cited

U.S. PATENT DOCUMENTS

| | | |
|---|---|---|
| 2,702,379 | 2/1955 | Barton . |
| 2,982,941 | 5/1961 | Chun . |
| 3,107,351 | 10/1963 | Milam .................................. 343/5 |
| 3,172,075 | 3/1965 | Kay .................................. 367/102 |
| 3,329,956 | 7/1967 | Caspers .............................. 343/119 |
| 3,366,922 | 1/1968 | Kay .................................. 367/102 |
| 3,789,353 | 1/1974 | Hunter et al. . |

FOREIGN PATENT DOCUMENTS

| | | |
|---|---|---|
| 600750 | 4/1933 | Fed. Rep. of Germany . |
| 26-6283 | 10/1951 | Japan . |
| 53125 | 4/1921 | Sweden . |
| 1107416 | 3/1968 | United Kingdom . |

OTHER PUBLICATIONS

Kay, The Radio and Electronic Engineer, vol. 44, Nov. 1974, pp. 605–627.

Primary Examiner—Richard A. Farley
Attorney, Agent, or Firm—Spencer & Kaye

[57] ABSTRACT

A method of locating an object by wave energy reflection and an apparatus therefor in which receiving outer transducers provide directional receptivities represented by polar lobes diverging on opposite sides of a reference axis and an inner receiving transducer provide a directional receptivity represented by a narrower polar lobe centered on the reference axis. The signals received from the outer transducers are operated upon in channels of the receiver to modulate them with a frequency swept local signal derived from the transmitted signal and develop indicator signals of difference frequency between the transmitted and received frequencies and which represent the range of the object. The outer signals are displayed binaurally, to enable the user to achieve firstly approximate directional sensing by binaural effect, and thereafter more accurate directional sensing by the use of signals developed in a central channel and derived from the inner transducer or outer transducers simulating an inner transducer. Gain in channels fed from the outer transducers is preferably adjusted as an inverse function of signal strength in the channel. Higher frequency components are preferably accentuated in the inner channel to improve object character recognition.

15 Claims, 8 Drawing Figures

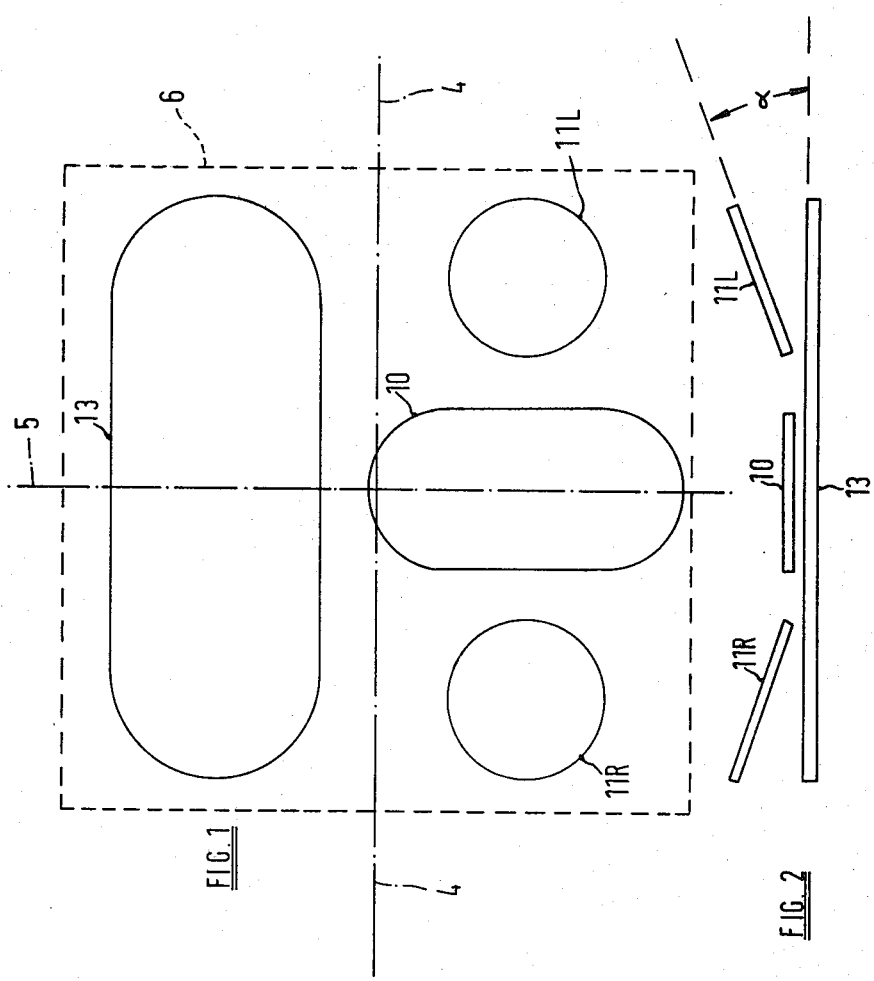

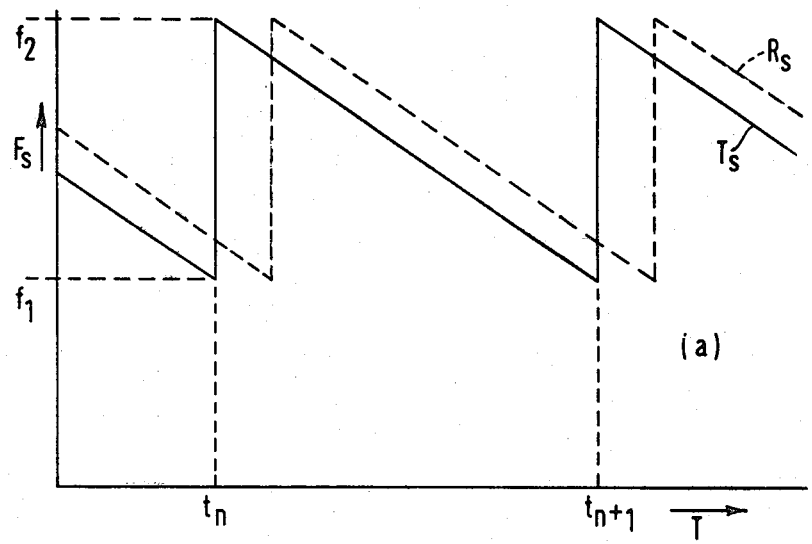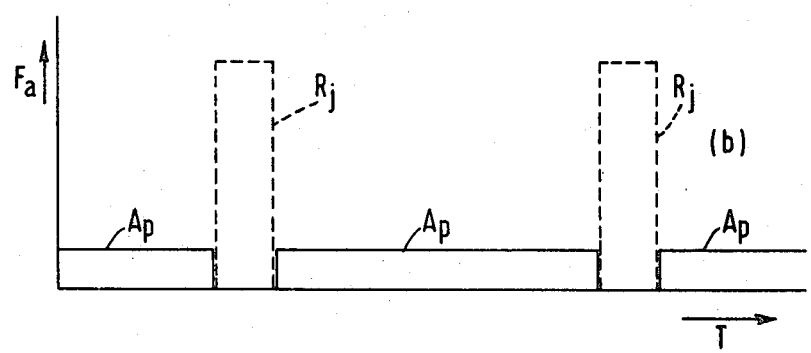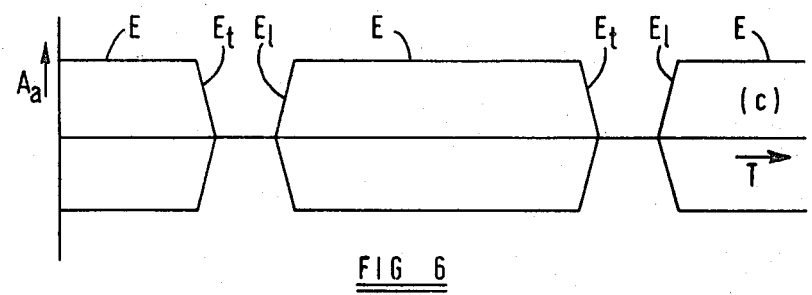
FIG 6

METHOD OF AND APPARATUS FOR ECHO LOCATION OF OBJECTS

BACKGROUND OF THE INVENTION

1. Field of the Invention

This invention relates to a method of and apparatus for providing information as to the existence or position of objects otherwise than by direct vision.

Such methods and apparatus are generally known as radar and sonar and respectively make use of reflection from the objects concerned of electro-magnetic wave energy and stress wave energy, preferably in the latter case in a frequency range above audibility, i.e. supersonic.

The method to which the present invention relates (hereinafter referred to as being of the kind specified) includes the steps of radiating wave energy (herein called the transmitted signal) from a station to a field of view, receiving at the station at least part of the transmitted signal (such part herein being called the received signal) reflected from the object, carrying out a frequency modulation of the transmitted signal to produce a frequency difference between the received signal and a correspondingly frequency modulated locally generated signal in a mode such that the magnitude of the frequency difference represents the range of the object from the station, operating upon the received signal with the locally generated signal to produce a range signal of said difference frequency, and determining or sensing the angular position of the object with respect to a reference axis extending through the station and the field of view by observation of a characteristic of the received signal and which is dependent upon the angular position of the object.

The apparatus to which the invention relates (hereinafter referred to as being of the kind specified) comprises a transmitting means for transmitting wave energy (herein called the transmitted signal) from a station to a field of view, receiving means at the station for receiving at least part of the wave energy (this part herein being called the received signal) reflected from an object in the field of view, frequency modulating means for producing a frequency difference between the received signal and a locally generated signal in a mode such that the magnitude of the frequency difference is representative of the range of the object from the station, means for operating on the received signal with a locally generated signal to produce a range signal of said difference frequency, and means for producing a direction signal from the received signal representative of the angular position of the object with respect to a reference axis extending through the station into the field of view.

2. Description of the prior art

One form of apparatus of the kind specified for performing a method of the kind specified is disclosed in earlier developments of the present inventor published in U.S. Pat. Nos. 3,172,075 and 3,366,922 relating to a blind aid. In the latter, two receiving transducers on a head set provide receptivities represented by divergent medially overlapping polar lobes and signals received by these transducers are fed through channels in the receiving means providing audible difference frequency indicator signals to the left and right-hand audio transducers on the head set. The polar lobe characteristics are designed to match the characteristics of the human auditory neural system so that a blind person wearing the head set can sense the direction from which a reflection of the transmitted signal is received, and, of course, can also make a subjective determination of the range by virtue of the frequency of the difference signal.

There is difficulty, however, in a user being able to resolve two stationary objects from each other where the angular spacing of such objects within the field of view is small, unless the range difference is of the order of at least 0.4 times the range of the more remote object.

Furthermore, in both of these earlier developments the transmitted signal is subject to swept frequency modulation over a wide frequency band of almost an octave, in consequence the indicator signal has a further desirable characteristic, namely it contains frequency components producing a complex tone as a result of the transmitted signal having been reflected from different parts of an object at slightly differing ranges, and possibly having different reflective properties. This enables a blind person experienced and suitably trained in the use of the apparatus to learn to recognise certain objects, or certain surface structures of objects, but an accurate inference as to the nature of the object or surface can best be made when the signal furnished to the user is attributable to only one object in the field of view and the above identified apparatus and methods do not enable this to be accomplished.

It is nevertheless highly desirable that, initially, information by way of indicator signals should be given to the user as to the existence of all, or at least a high proportion, of the objects present in the field of view prior to the user being furnished with information such as to enable an inference to be drawn as to the nature of any one object. The prior methods and forms of apparatus do not solve the problem of how to deal with these somewhat incompatible requirements and the aim of the present invention is to do so.

SUMMARY OF THE INVENTION

According to one aspect of the present invention a method of providing information of the kind specified is characterised by the steps of establishing, in respect of the received signal, respective directional receptivities, herein called the outer lobes, defined by receiving polar diagrams having maxima spaced apart angularly on opposite sides of the reference axis, and establishing a further directional receptivity, herein called the inner lobe, defined by a further polar diagram having a maximum lying angularly between the respective maxima of the outer lobes, and of narrower angular width than that of the outer lobes considered collectively, effecting approximate determination of the angular position of the object by observation of a characteristic in respect of indicator signals developed from the received signals due to the outer lobes, and effecting more precise determination of said angular position by observation of a characteristic of an indicator signal developed from the received signal due to the inner lobe.

By this method the user is enabled to discriminate between objects at the same or close ranges because when the inner lobe is centered on one of the objects there will be a very marked diminution in the signal received from the other objects due to the narrower angular width of the inner lobe, and indeed the signal received from the other object may be eliminated altogether.

It is preferred that the method should also include the step of changing the composition of the indicator signal by varying the ratio of the magnitude of the component of the indicator signal derived from the outer lobes to the magnitude of the component of the indicator signal derived from the inner lobe as a function of angular deviation of the object from the reference axis and in a sense to reduce this ratio as the angular deviation decreases.

This enables discrimination to be attained by effective attenuation or elimination of indicator signal components derived from the outer lobes due to other objects when the inner lobe is centered, or nearly centered, on the object on which the user wishes to concentrate.

Yet another step which it is preferred to include in the method of the invention is that of selectively varying the frequency response to the received signals due to the outer lobes and/or inner lobe, thereby to vary the magnitudes of different frequency components collectively forming the indicator signal, and in such a way as to emphasise the higher frequency components in respect of the indicator signal derived from the inner lobe.

This ensures that character indication is confined, or is more pronounced, to the stage of operation at which the inner lobe is centered or nearly centered on the object. The user is thus not distracted by possibly different character indications in the indicator signals derived from the outer lobes at a stage of the operation when the principal concern of the user is to identify the character of the object. Moreover, used in combination the feature of increasing the magnitude of the indicator signal component due to the central lobe, in comparison with the magnitude of the indicator signal component due to the outer lobes, the ability of the user to recognise object character of a single object is still further enhanced.

A further aspect of the invention resides in the provision of apparatus of the kind specified characterised in that the receiving means includes transducer means providing respective directional receptivities, herein called the outer lobes, defined by receiving polar diagrams having maxima spaced apart angularly on opposite sides of the reference axis, and a directional receptivity, herein called the inner lobe, defined by a polar diagram having a maximum lying angularly between the respective maxima of the outer lobes and having a width less than that of the outer lobes considered collectively, means to enable the inner and outer lobes to be moved collectively and angularly to each side of the reference axis, indicator means for furnishing an indication of the direction of the object, receiving channels connected at one of their ends to the transducer means and at the other of their ends to the indicator means, and including means responsive to reception of received signals derived from the transducer means establishing the outer lobes to generate indicator signal components providing approximate angular indication of the angular position of the object, and means responsive to reception of a received signal derived from the transducer means establishing the inner lobe to generate an indicator signal component providing more precise indication of said angular position.

The apparatus preferably includes further features identified in the description relating to the drawings and enabling it to provide still further improved angular discrimination between objects and improved character recognition as specifically identified in the preferred features of the method.

BRIEF DESCRIPTION OF THE DRAWINGS

The invention will now be described, by way of example, with reference to the accompanying drawings wherein:

FIG. 1 is a diagrammatic view in front elevation showing the general form and arrangement of an array of transducers and mounting means therefor for transmitting and receiving the wave energy;

FIG. 2 is a diagrammatic plan view of the transducer array shown in FIG. 1 (omitting the diagrammatically shown mounting means);

FIG. 6 comprises graphs illustrating the development of the indicator signals derived from the received signals;

DESCRIPTION OF THE PREFERRED EMBODIMENT

Figure 3:
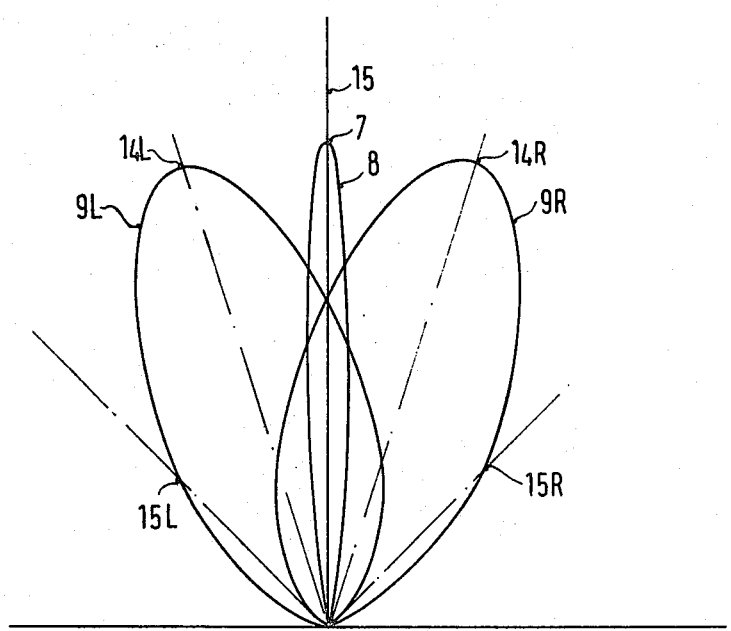
FIGS. 3 and 4 respectively are polar diagrams and cartesian representations of the directional receptivities of the receiving transducers.

Referring to FIGS. 1 to 5, the transmitting means of the apparatus shown comprises a transmitting transducer 10 which radiates stress-wave energy in the ultrasonic frequency range and has an aperture which energises a field having an angular width appropriate to the environment under investigation. This field may typically be 60°–90° in azimuth, as shown by boundary lines 15L and 15R, FIG. 3, and 10°–30° in elevation.

The transmitting means further comprises a voltage controlled oscillator 17 frequency modulated to provide frequency sweeps of saw tooth form by a linear saw tooth generator 16. The oscillator 17 drives a power amplifier 19 which feeds the transducer.

The transmitter channel I coupling the oscillator 17 to the amplifier 19 incorporates a frequency shaping network 18. Alternatively or in addition a similarly functioning network may be provided in the transmitter channel between the transducer 10 and the amplifier 19. A frequency shaping characteristic may alternatively or in addition be attained by transducer design or auxiliary means for changing the transducer function (radiation to medium) of the transmitting transducer so as to vary its response during the frequency sweep.

Figure 4:
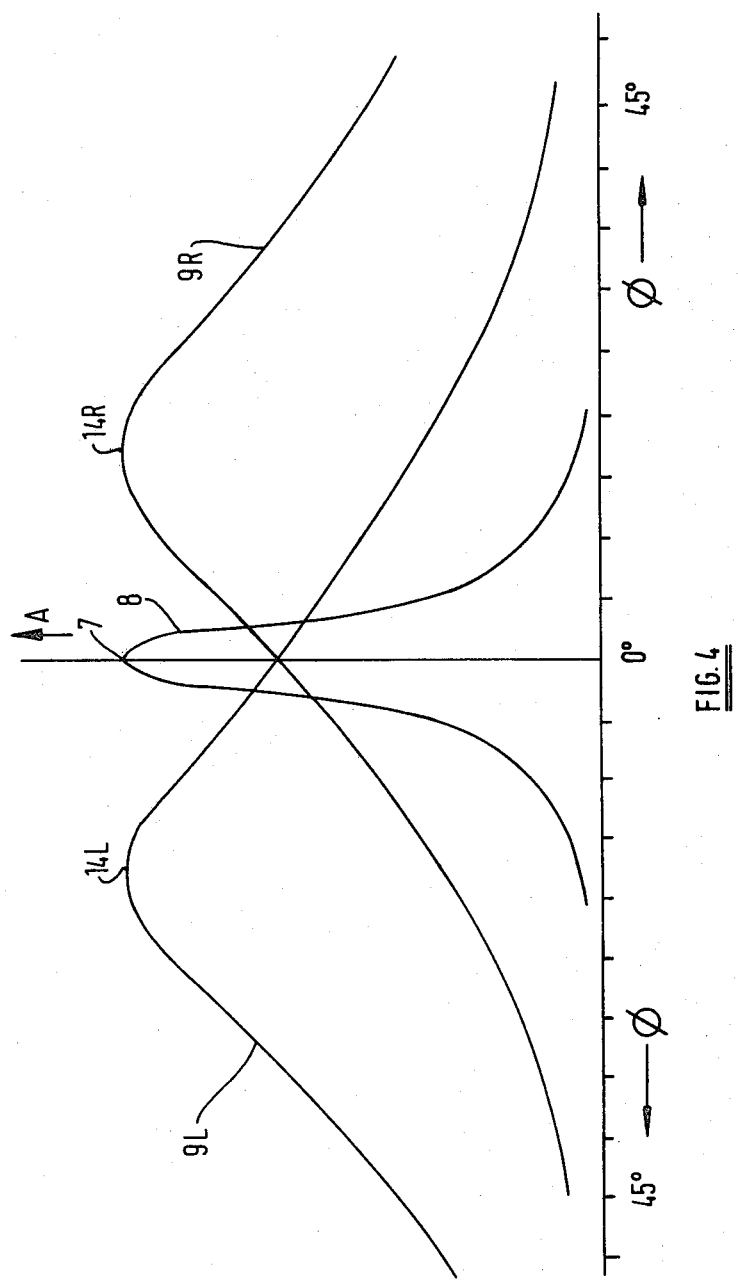

The receiving means comprises outer receiving transducers 11L and 11R which receive part of the wave energy reflected from surface portions of an object in the field and which presents discontinuity to propagation of the wave energy in the medium (air or water) permeating the field. Their receptivity characteristics may typically be as shown in FIGS. 3 and 4 for the azimuthal plane. The maxima 14L, 14R of lobes 9L, 9R of the left and right transducers 11L, 11R respectively lie angularly to the left and right of the median reference axis 15. The two receiver transducers 11L, 11R ideally produce received signals of equal frequency and magnitude only from an object on a vertical median plane containing the axis 15. Thus a difference of amplitude (and a slight frequency difference) between the received signal of left and right transducers indicates that the object is situated on the left of the median plane or the right of the median plane. Adjustment of the splay angle α shown in FIG. 2 varies the sensitivity of the indication to object direction and is selected to be sufficient to cause a clear left or right object direction to be sensed at the indicator means 28L, 28R by a user.

A receiving inner transducer 13 has a receptivity characteristic depicted as inner lobe 8 providing an angularly narrow field of reception (relative to the wider lobes of transducer 11L and 11R) in the azimuth plane and is directed so that its maximum 7 lies between the respective maxima 14L, 14R and is preferably on the reference axis 15. Ideally the inner transducer 13 should have no secondary lobes but in practice small secondary lobes can be tolerated.

The receiving transducers are carried by a mounting means diagrammatically by a dashed line 6 in FIG. 1 which enables them to be moved collectively and angularly in azimuth about vertical axis 5, and preferably also in elevation about horizontal axis 4. Thus the mounting means may comprise a head set (when the apparatus is designed for use as a blind aid for blind persons), or it may comprise any suitable carrier which can be worn by a diver or mounted on a ship and which is movable angularly at least in azimuth and preferably also in elevation (when the apparatus is designed as a sonar apparatus for underwater investigations).

Each of the receiver transducers 11R, 11L and 13 are connected respectively to form the inputs to channels II, III and IV in which indicator signals derived from the received signals are developed. The channels contain, in sequence, preamplifiers 21R, 21, 21L, frequency shaping networks 22R, 22, 22L, modulators which may be in the form of multipliers 23R, 23, 23L. Means for providing a local signal for modulating the received signals in the multipliers comprises a link 20 through which a portion of the transmitted signal is fed. The received signals, and the locally generated signal, which is of swept frequency equal at any instant to that of the transmitted signal, are fed in each case to respective inputs of the multipliers 23R, 23L, 23 to produce outputs containing a sum component and a difference component of the two input frequencies respectively of the received and transmitted signals. The sum frequency components are filtered out by low pass filter means in the modulators and only the difference frequency components pass to the remaining circuits of channels II and III, namely automatic level control circuits 24R, 24L, summing circuits 25R, 25L, frequency shaping circuits 26R, 26L, amplifiers 27R, 27L and indicator means 28R, 28L which may comprise head phones or other sound reproducers providing a binaural input to the users ears.

The frequency-time graphs of FIG. 6 relate to the transmitted and the received signals. Section (a) of FIG. 6 shows the frequency $F_s$ plotted against time T for the transmitted signal, curve $T_s$ which is swept in accordance with a falling saw tooth characteristic between high and low supersonic frequencies $f_2$, $f_1$ typically 80 KHz and 40 KHz, and the frequency of a typical received signal curve $R_s$. The frequency sweeps begin and end at times $t_n$, $t_{n+1}$ etc. As shown is section (b) in which difference frequency $F_a$ is plotted against time T, there is a "lost" or rejected signal $R_j$ when the difference frequency is outside the observable (audible) range, the audible signal being represented by pulses $A_p$ of audible frequency, the magnitude of which frequency represents the range of the object. In section (c) the amplitude $A_a$ of the pulses $A_p$ is plotted against time T. Envelopes E of the pulses of audible frequency fed to the indicator means (when in the form of a sound reproducing transducer) are, shaped by conventional gating circuits (not shown), to provide a more gradual rise and fall at their leading and trailing edges $E_1$, $E_t$ to avoid sudden amplitude changes which would be heard as "clicks". Circuits 26R, 26L are responsive to frequency to provide variable gain compensating for attenuation in the medium at the longer ranges (higher difference frequencies).

A fuller disclosure of the form and manner of operation of typical forms of these circuits is contained in U.S. Pat. No. 3,172,075 and British patent specification No. 978,741.

Thus the outer transducers feed sounds to the ears binaurally, that is the left and right ears are supplied with independent signals, and the difference in loudness between the two indicates the direction of the sound to be from the left or right of the listener.

The difference frequency componet of the signal from the inner, central, transducer 13 in channel IV is fed from the multiplier 23 via a line 29 to an automatic level controller activating amplifier 24 which includes range equalizing means and then to the automatic level controllers 24R, 24L in the outer receiver channels II and III, and also is fed via line 30 and amplifier 31 to the two outer receiving summing audio amplifiers 25R, 25L to be summed with the outer receiver difference signal components already in the channel II and III.

Referring now to performance of the method by use of the apparatus, and considering an object to the left of a vertical median plane axis 15 drawn through a reference axis, the received signal from the central inner transducer 13 will be small and may be neglected. The received signal from the left transducer 11L will be greater than that from the right transducer 11R. Binaurally, a user will get an indication that the object is to the left. Turning all of the system transducers to the left, i.e. anti-clockwise considering FIGS. 2 and 3, so that the direction of the median plane approaches the object direction, causes the difference in loudness to the ears between the left and right signals to decrease, thereby reducing the angle of directional indication to the left. At the same time, the signal from the inner transducer 13 increases, gradually at first, then rapidly as the object direction is approached by the maximum 7 of the inner lobe 8. The direction is determined by the user sensing the condition that the inner signal has become a maximum, as well as there being a binaural signal from the outer transducers. It is arranged that as the inner signal increases rapidly with changing direction φ, the object being within the polar lobe of the inner transducer. The automatic level control circuits 24, 24R, 24L reduce the gain in channels II and III, and thus reduce the binaural signal. The inner transducer signal then dominates. The degree to which this occurs may be adjusted to suit a range of circumstances and the interests of the user by adjusting the gain in amplifier 24. Thus, as the transducers are rotated further anti-clockwise beyond the direction of the object so that the object lies close to the right-hand boundary or falls outside the polar lobe 8 of the inner transducer, the level of the signal in channel IV quickly diminishes producing re-adjustment of the gain in level control circuits 24R, 24L, and the signals in channels II and III dominated both by virtue of the intrinsic form of the outer lobes 9R, 9L and increase of the level of gain giving a clear indication of the object being to the right.

Hence a user can turn the transducers quickly left or right to look at an object, make a slight bracketing movement, if necessary, and stop when the inner, central, indication is strongest.

Figure 7:
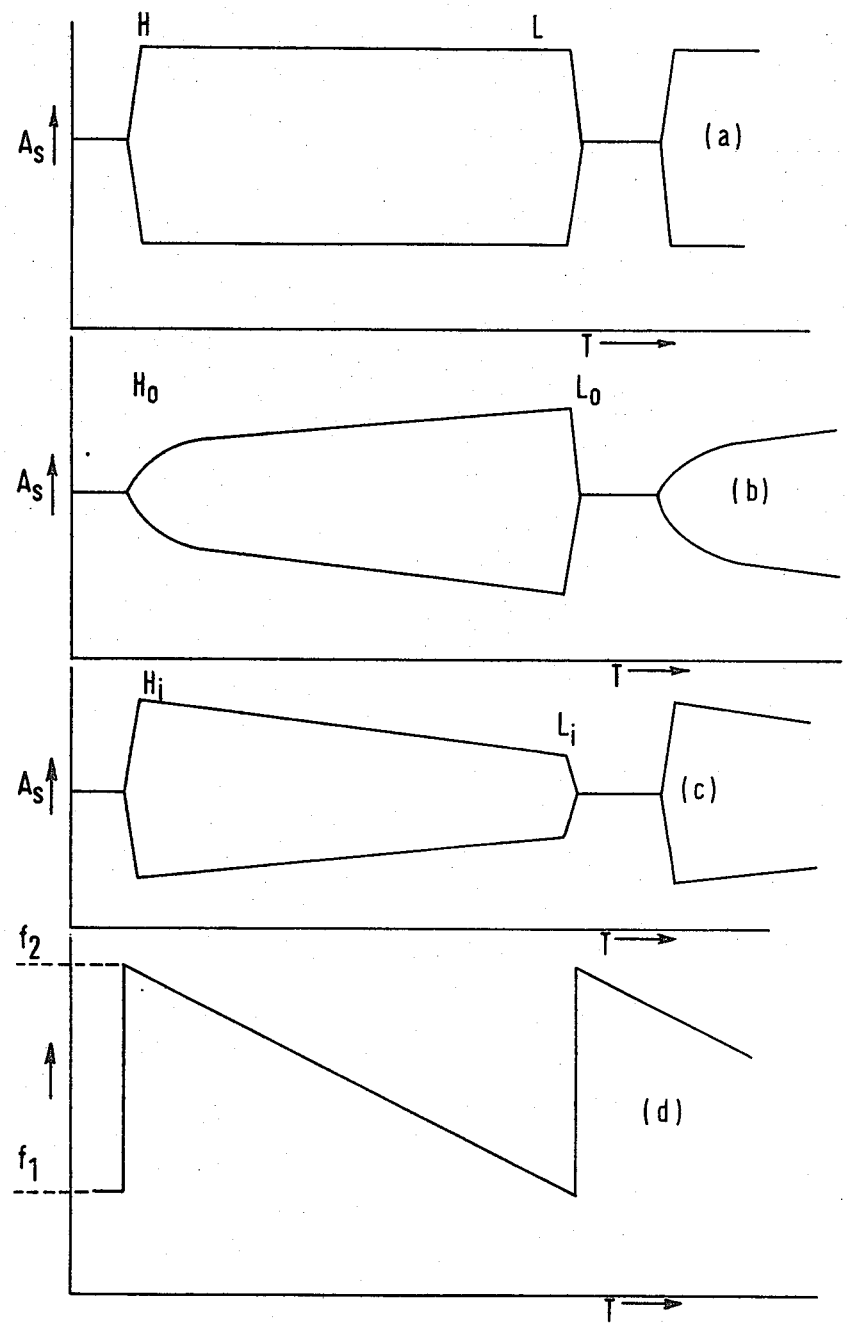
FIG. 7 comprises graphs illustrating the frequency shaping, i.e. selective attenuation or amplification of certain frequency components of the received signals as a function of the instantaneous frequency of the transmitted frequency swept signal.

A further characteristic which may be introduced is that of enhancing the effects which provide an indication of the object character. Thus, FIG. 7 shows in section (a) the amplitude $A_s$ of the supersonic received signal incident at the receiving transducers (assuming no frequency shaping has been applied in the transmitting channel), section (b) the amplitude $A_s$ of the received signals in channels II and III, section (c) the amplitude of the received signals in channel IV and in section (d) the frequency $F_s$ of the transmitted signal, all plotted against time T. In sections (a), (b) and (c) the references H L, $H_o$, $L_o$, $H_i$, $L_i$ denote the high and low ends of the frequency sweep. The received signal high frequency components in the outer transducer channels II and III are de-emphasised as shown in section (b). This is effected by the ultrasonic frequency shaping networks 22L, 22R, or others which may be anywhere between and include the transducers and the multipliers, this de-emphasis causes a "softening" of the audio signal developed at the indicator transducers 28R, 28L, e.g. head phones, during the sweep period and object character indication in the signal is then reduced also. The degree to which this occurs depends upon the degree of de-emphasis. This avoids or minimises presentation to the user of character information from objects sensed by the outer lobes when the object under character investigation is in the median plane or within the field of the inner lobe 8. The same principles would apply if the saw-tooth modulation were rising, instead of falling, the envelopes in sections (A) to (D) being then reversed end-to-end.

In the inner channel IV as shown in section (b) the high frequency components are emphasised in the ultrasonic frequency shaping network 22, creating a "hardness" to the audio signal and an enhancement of the object character indication. This effect may be made more pronounced by the operation of the shaping circuit 18 of the transmitter channel I which can be used to increase the magnitude of higher frequency components relatively to the magnitude of the lower frequency components.

Thus, when viewing an object to the left or right of the polar lobe of the inner transducer the primary indication is one of left or right direction with little indication of object character. As the user turns toward the object direction the indication becomes one which enables the user to accomplish centralising as already described and also provides enhanced character recognition.

Two different objects may then be more readily discriminated from each other even though they are in the wide field of view and at the same range. Also two objects relatively close angularly may be resolved by the field of the inner transducer 10. Any motion of the objects in the wide field of view will be quickly perceived by a change in direction indication. Concentration on one object through use primarily of the audio signal provided by the inner receiver channel IV inhibits perception of another object by the automatic level controllers, 24R, 24L, the influence of which can be varied by adjusting the gain in amplifier 24 according to the needs of the user.

It will be evident therefore that the invention attains the benefits of a binaural system to enable approximate directional determination to be made followed by more precise determination by the monaural system of channel IV in sequence in one operation using a single apparatus which may, if desired, also incorporate an enhanced ability in object character determination.

Figure 8:
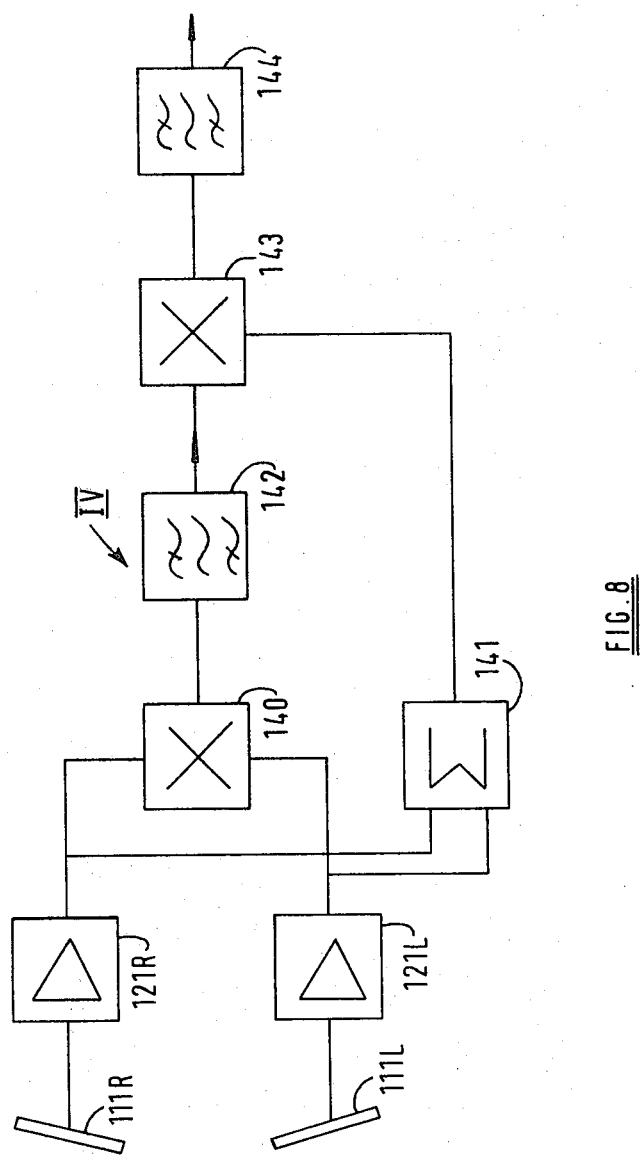
FIG. 8 illustrates a modification of the embodiment of FIG. 5 dispensing with the use of the inner receiving transducer 13 while retaining development of the indicator signal formerly derived therefrom by the use of the outer receiving transducers.

An alternative embodiment of apparatus incorporates the modification shown in FIG. 8. Parts corresponding functionally to those already described are designated by corresponding references with prefix 1 and the preceding description is applicable.

Figure 5:
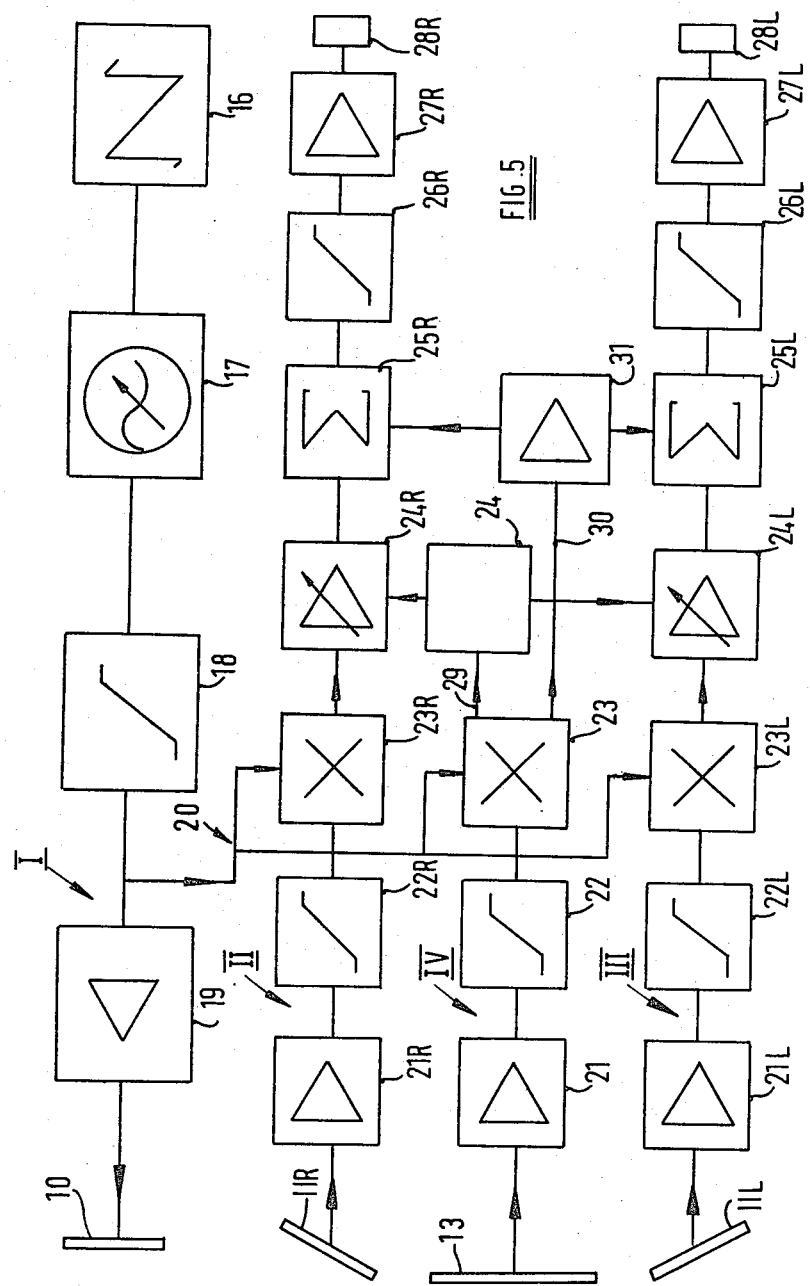
FIG. 5 is a schematic circuit diagram of one embodiment of apparatus in accordance with the invention.

The receiver may be constructed using outer transducers 111L and 111R as spaced apertures together with multipliers to obtain the effect of using transducer 13 as shown in FIG. 5. Thus, the outputs of the preamplifiers in receivers 121L and 121R are fed respectively to two inputs of a multiplier 140 to give an output containing a sum frequency component (substantially $2f_L$ or $2f_R$) and which has an amplitude equal to the product of the amplitudes of the two inputs which differ in amplitude but negligibly in frequency whenever the object is not in the median vertical plane. Additionally, the outputs from the two preamplifiers 121L, 121R are summed in a summing network 141, otherwise isolated from the binaural outer transducer channels, to provide an output of which the amplitude is the sum of the amplitudes of the two inputs at a frequency $f_R$ or $f_L$. The resultant amplitude product signal from multiplier 140 is fed through a filter 142 which passes only the sum frequency $f_R$ to $f_L$ to a further multiplier 143 and the sum signal at a frequency $f_R$ or $f_L$ from network 141 is also fed to the multiplier 143, the output of which contains a difference signal at a frequency $f_R$ or $f_L$.

The amplitudes of the received signals respectively at transducers 111R and 111L vary by equal and opposite amounts with angular deviation of the object from the median plane, and are equal when the object lies in the median plane.

Thus the sum of the amplitudes remains more constant, the product of the amplitudes is at a maximum when the input amplitudes and phases are equal, and the difference signal is also at a maximum when the object is in the median plane.

The difference signal from multiplier 143 is isolated by filter 144 and fed to one input of multiplier 23 of the circuit shown in FIG. 5 via network 22 in substitution for the input which in that circuit is fed from preamplifier 21.

The modified circuit operates equivalently to that of FIG. 5 but eliminates transducer 13.

The central lobe produced by transducers 111R, 111L simulating the transducer 13 is not simply the combination of the outer lobes 9R, 9L as shown in FIG. 3, for the reason that the transducers 111R, 111L would be physically spaced apart similarly to 11R and 11L and hence the angular width of the simulated inner lobe is much less than would be the case if these transducers were radiating from the same point.

In practice the aperture width of the transducer 13 and the effective aperture width of transducers 111R, 111L, when operating to simulate transducer 13, is desirably appreciably smaller than the angular width of the individual lobes 9R, 9L, the geometry of FIGS. 3 and 4 being exemplary.

In applying the invention by the utilisation of electromagnetic wave energy, the antennae which would then be provided for radiating this energy would be designed to provide a polar diagram similar to that of FIG. 3. Appropriate modifications to the circuitry illustrated in FIG. 5 and FIG. 8 would be made in accordance with normal radar techniques which would be known to those skilled in the art. The indicator means would preferably be of binaural audible form, e.g. head phones or loudspeakers.

I claim:

1. In a method of providing information as to the existence and/or position of an object otherwise than by direct vision, including the steps of radiating wave energy (herein called the transmitted signal) from a station to a field of view, receiving at the station at least part of the transmitted signal (such part being herein called the received signal) reflected from the object, carrying out a frequency modulation of the transmitted signal to produce a frequency difference between the received signal and a correspondingly frequency modulated locally generated signal in a mode such that the magnitude of the frequency difference represents the range of the object from the station, operating upon the received signal with the locally generated signal to produce a range signal of said difference frequency, and determining or sensing the angular position of the object with respect to a reference axis extending through the station and the field of view by observation of a characteristic of the received signal and which is dependent upon the angular position of the object, the improvement comprising the further steps of:

a. establishing, in respect of the received signal, respective directional receptivities, herein called the outer lobes, defined by receiving polar diagrams having maxima spaced apart angularly on opposite sides of the reference axis, b. establishing a further directional receptivity, herein called the inner lobe, defined by a further polar diagram having a maximum lying angularly between the respective maxima of the outer lobes and being of narrower angular width than the width of the outer lobes considered collectively, c. effecting approximate determination of the angular position of the object by observation of a characteristic in respect of indicator signals developed from the received signals due to the outer lobes, d. effecting more precise determination of said angular position by observation of a characteristic of the indicator signal developed from the received signal due to the inner lobe.

2. A method according to claim 1 including the further step of changing the composition of the indicator signal by varying the ratio of the component of the indicator signal derived from the outer lobes to the component of the indicator signal derived from the inner lobe as a function of angular deviation of the object from the reference axis, and in a sense to reduce this ratio as the angular deviation decreases.

3. A method according to claim 2 including the further step of varying the magnitudes of the indicator signal components due to the outer lobes relatively to the magnitude of the indicator signal component due to the inner lobe as a function of said angular deviation by controlling the level of one of the signal components as a function of the level of the other of the components in a receiving channel in which the received signal is processed before indication.

4. A method according to claim 1 including the further step of selectively varying the magnitude of the transmitted signal as a function of the frequency thereof.

5. A method according to claim 1 further including the steps of selectively varying the frequency response to the received signals due to the outer lobes and/or inner lobe thereby to de-emphasise or emphasise the tonal characteristics generated by differential reflection of the transmitted signal ($T_s$) from different surfaces.

6. A method according to claim 1 including the further step of transducing the indicator signal into a binaural audible display.

7. In apparatus for providing information as to the existence and/or position of an object otherwise than by direct vision comprising transmitting means for transmitting wave energy (herein called the transmitted signal) from a station to a field of view, receiving means at the station for receiving at least part of the wave energy (this part herein being called the received signal) reflected from an object in the field of view, frequency modulating means for modulating the transmitted signal and producing a frequency difference between the received signal and a correspondingly frequency modulated locally generated signal in a mode such that the magnitude of the frequency difference is representative of the range of the object from the station, means for operating on the received signal with the locally generated signal to produce a range signal of said difference frequency, and means for producing an indicator signal from the received signal representative of the angular position of the object with respect to a reference axis extending through the station into the field of view, the improvement wherein the receiving means includes:

a. transducer means providing respective directional receptivities, herein called the outer lobes, defined by receiving polar diagrams having maxima spaced apart angularly on opposite sides of the reference axis, and also a directional receptivity, herein called the inner lobe, defined by a polar diagram having a maximum lying angularly between the respective maxima of the outer lobes and having a width less than the widths of the outer lobes considered collectively, b. means to enable the inner and outer lobes to be moved collectively and angularly to each side of the reference axis, c. indicator means for furnishing an indication of the direction of the object, d. receiving channels connected at one of their ends to the transducer means and at the other of their ends to the indicator means, and including means responsive to reception of received signals derived from the transducer means establishing the outer lobes to generate indicator signal components providing approximate angular indication of the angular position of the object, and means responsive to reception of a received signal derived from the transducer means establishing the inner lobe to generate an indicator signal component providing more precise indication of said angular position.

8. Apparatus according to claim 7 wherein the receiving means includes two channels connected respectively to the transducer means providing the respective outer lobes and feeding respective indicator devices, and these channels contain signal level control devices for varying the contribution in the indicator signal fed to the indicator devices which is derived from the outer lobe transducer means relative to the contribution in the indicator signal derived from the inner lobe transducer means as a function of angular deviation between the object and the reference axis and in a sense to increase the contribution of the inner lobe as this angular deviation decreases.

9. Apparatus according to claim 8 wherein the two channels contain variable gain control devices controlling the magnitude of respective indicator signals derived from the outer lobe transducer as a function of the magnitude of the indicator signals derived from the inner lobe transducer means in a manner to reduce outer lobe derived indicator signals as the inner lobe derived indicator signals increase.

10. Apparatus according to claim 8 wherein the two channels contain summing circuits for adding thereto indicator signals derived from the inner lobe transducer means at a position downstream of any variable gain control devices provided.

11. Apparatus according to claim 7 wherein the transmitting means includes frequency modulating means for modulating the frequency of the transmitted signal in sweeps between higher and lower values and also includes frequency responsive means for selectively varying the magnitude of the transmitted signal as a function of frequency.

12. Apparatus according to claim 7 wherein:
 a. the transmitting means includes frequency modulating means for modulating the frequency of the transmitted signal in sweeps between higher and lower values,
 b. the receiving means includes frequency responsive means for varying the magnitude of the indicator signal, at a stage prior to reception at the indicator means, as a function of frequency to emphasise or de-emphasise tonal characteristics generated by differential reflection of the transmitted signal from different object surfaces.

13. Apparatus according to claim 7 wherein:
 a. the receiving means includes two channels connected respectively to the transducer means providing the respective outer lobes and feeding respective indicator devices, and these channels contain signal level control devices for varying the contribution in the indicator signal fed to the indicator devices which is derived from the outer lobe transducer means relatively to the contribution in the indicator signal derived from the inner lobe transducer means as a function of angular deviation between the object and the reference axis, and in a sense to increase the contribution of the inner lobe as this angular deviation decreases,
 b. each of the two channels contains at least one device for varying the magnitude of the indicator signal therein derived from the outer lobe transducer means as a function of frequency and in a manner to reduce the higher frequency relative to the lower frequency components.

14. Apparatus according to claim 7 wherein:
 a. the transducer means includes two transducers common to both outer lobe and inner lobe reception,
 b. the receiver further includes a channel for inner lobe reception containing a modulator for generating a signal having an amplitude equal to the product of the amplitude of the signals derived from the two transducers, said product signal having an amplitude varying as a function of the difference between the amplitudes and phases of said signals derived from the two transducers
 c. said channel contains a summing amplifier for generating a signal having an amplitude equal to the sum of the last said two signals
 d. said channel contains yet a further modulator fed with the product and sum signals respectively and generating an output signal of difference frequency which also varies in magnitude in conformity with the magnitude variation of the product signal and which thereby simulates indicator signals derived from the inner lobe.

15. Apparatus according to claim 7 wherein the indicator means provides a binaural display.

* * * * *